United States Patent
Brisebois

(10) Patent No.: US 10,021,509 B2
(45) Date of Patent: Jul. 10, 2018

(54) METHODS AND APPARATUS TO PROVIDE AN UPDATE VIA A SATELLITE CONNECTION

(71) Applicant: AT&T Mobility II, LLC, Atlanta, GA (US)

(72) Inventor: Arthur Richard Brisebois, Cumming, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 94 days.

(21) Appl. No.: 15/080,828

(22) Filed: Mar. 25, 2016

(65) Prior Publication Data

US 2017/0280266 A1   Sep. 28, 2017

(51) Int. Cl.
| | | |
|---|---|---|
| H04L 29/08 | (2006.01) | |
| H04B 7/185 | (2006.01) | |
| H04W 4/50 | (2018.01) | |
| H04W 4/00 | (2018.01) | |

(52) U.S. Cl.
CPC ........ *H04W 4/001* (2013.01); *H04B 7/18526* (2013.01); *H04B 7/18578* (2013.01); *H04L 67/34* (2013.01); *H04W 4/50* (2018.02)

(58) Field of Classification Search
None
See application file for complete search history.

(56) References Cited

U.S. PATENT DOCUMENTS

| 5,987,233 A | 11/1999 | Humphrey |
| 7,844,964 B2 | 11/2010 | Marolia |
| 2002/0152467 A1 | 10/2002 | Fiallos |
| 2004/0163135 A1 | 8/2004 | Giaccherini et al. |
| 2005/0050538 A1 | 3/2005 | Kawamata et al. |
| 2007/0006214 A1 | 1/2007 | Dubal et al. |
| 2015/0373546 A1* | 12/2015 | Haugen ............... H04W 12/08 726/22 |
| 2017/0195318 A1* | 7/2017 | Liu ................... H04L 63/0823 |

OTHER PUBLICATIONS

Sweet, "Do you need to force an update on Genie Mini Clients?," The Solid Signal Blog, May 6, 2014, retrieved from "http://blog.solidsignal.com/content.php/3122-Do-you-need-to-force-an-" on Nov. 19, 2015, (4 pages).
val_installs, "Tech Tip—Software Download Guidelines," Directv Technical Forums, Mar. 25, 2013, retrieved from "http://forums.directv.com/thread/11210085" on Nov. 19, 2015 (3 pages).

* cited by examiner

*Primary Examiner* — Diane Lo
(74) *Attorney, Agent, or Firm* — Hanley, Flight & Zimmerman, LLC

(57) ABSTRACT

Methods, apparatus, systems and articles of manufacture to provide an update via a satellite connection are disclosed. An example method includes scanning a local area network to identify a device in communication with the local area network. A hardware address of the device is determined. The hardware address of the device is compared against a whitelist of hardware addresses included in an update schedule. In response to detecting that the hardware address of the device is included in the whitelist of hardware addresses, an update identified in the update schedule is received via a broadcast distribution system, is recorded, and is transmitted to the device.

25 Claims, 11 Drawing Sheets

METHODS AND APPARATUS TO PROVIDE AN UPDATE VIA A SATELLITE CONNECTION

FIELD OF THE DISCLOSURE

This disclosure relates generally to updating a device, and, more particularly, to methods and apparatus to provide an update via a satellite connection.

BACKGROUND

Different types of network-connected devices have become more prevalent in many use cases. For example, a typical household may have a network-connected thermostat, a network-connected smart television, and a smartphone in their home. Each of those devices may periodically receive updates via, for example, a network.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Households have been evolving to include many different types of devices such as, for example, smart phones, computers, Internet of Things (IoT) devices (e.g., Internet enabled thermostats, Internet enabled security systems, Internet enabled home automation systems, etc.), smart televisions, etc. Periodically, those devices are to receive updates. As used herein, an update is defined to include any sort of instructions and/or data transmitted to the device to modify operation of the device. An update may include, for example, a software application update, a firmware update, configuration data, an operating system update, a driver update, additional media for use by the device (e.g., new video game content such as a map), and/or any other information and/or instructions used to modify functionality of the device. As those devices and their associated capabilities become more complex, the number of updates and size of updates increase.

Moreover, it is expected that IoT devices and/or M2M (machine to machine) devices will soon outnumber smartphones by a large margin. Each of those IoT devices and/or M2M devices likely will receive updates from their respective manufacturer. As IoT and/or M2M technologies mature, it is likely that such devices will frequently receive updates.

Delivering many updates to many devices is a difficult task. In many cases, an update may be transmitted to a device on a one-to-one basis (e.g., using a unicast transmission). Updating multiple devices might require transmitting the update individually to each device. When, for example, updating a smartphone that communicates via a network provided by a wireless service provider (e.g., AT&T®), transmitting a two gigabyte update individually to one hundred thousand smartphones (equivalent to transmitting two hundred terabytes) can cause a severe strain on the network. Such strain may result in poor performance for users, as a portion of the transmission capacity of the network is devoted to delivering updates.

Figure 1:
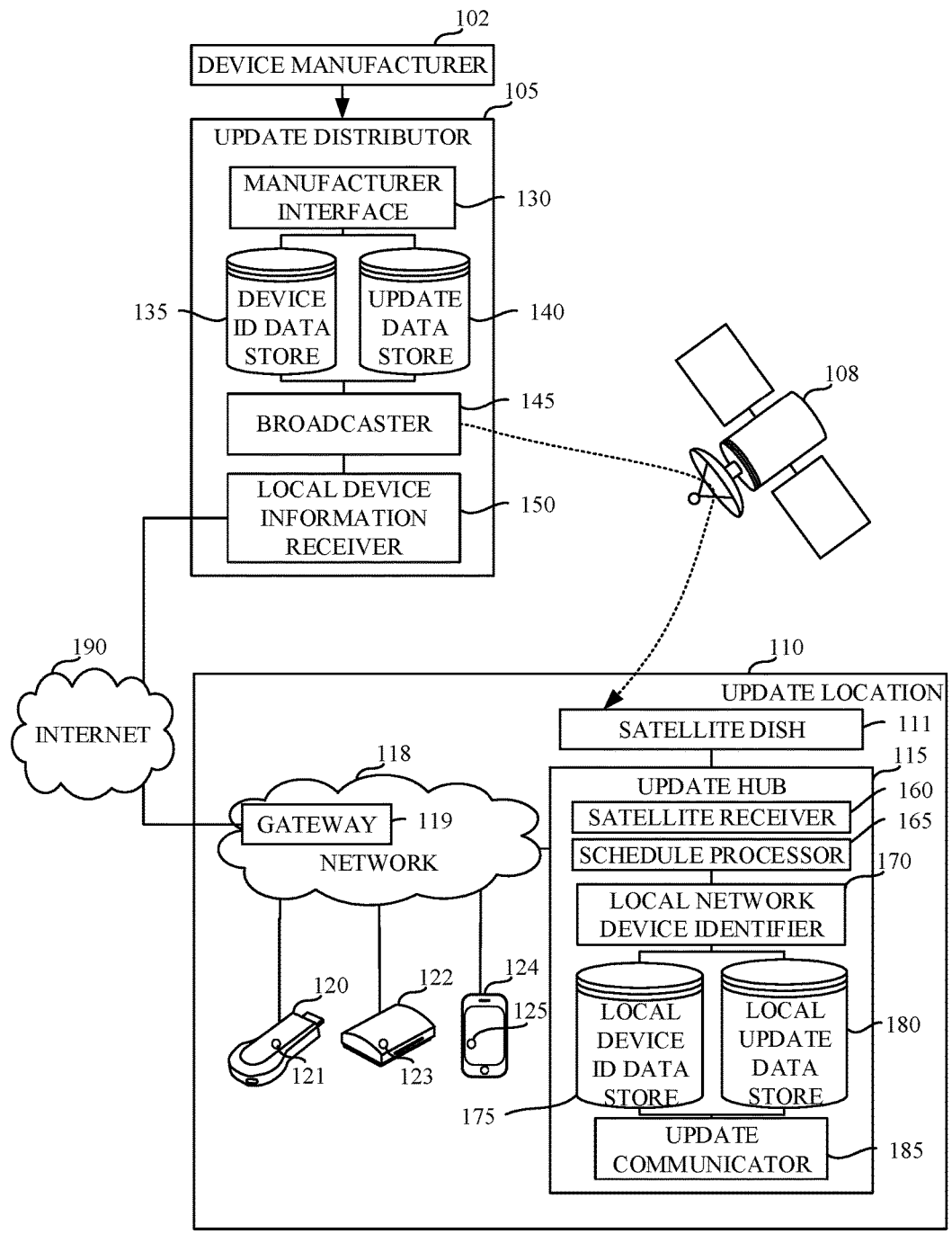
FIG. 1 is a block diagram illustrating an example system to provide an update via a satellite connection.

FIG. 1 is a block diagram illustrating an example system to provide an update via a satellite connection. The examples disclosed in the illustrated example of FIG. 1 utilize satellite broadcast technology to deliver updates in a fashion that alleviates strain on traditional update delivery systems. In examples disclosed herein, a device manufacturer 102 provides an update and a whitelist of device identifiers (e.g., media access control (MAC) addresses) to which the update should apply to an update distributor 105. The update distributor 105 broadcasts, via a satellite 108, a schedule identifying when the update (perhaps among other updates) will be broadcast for the devices identified by the device identifiers in the whitelist. In examples disclosed herein, the whitelist is implemented as a list of device identifiers. However, any other approach to identifying device identifiers may additionally or alternatively be used such as, for example, a range of device identifiers.

The schedule can then be received at an update location 110 via a satellite dish 111. An update hub 115 at the update location 110 scans a network 118 to identify devices 120, 122, 124. The update hub 115, having identified the devices on the network 118, reviews the schedule provided by the update distributor 105 to identify an upcoming update broadcast applicable to a device on the network 118. The example update hub 115 records the broadcast update according to the schedule. The update recorded by the update hub 115 is then provided to the device 120, 122, 124.

In the illustrated example of FIG. 1, a single update hub 115 corresponding to a single update location 110 is shown. However, any number of update hubs servicing any number of update locations may additionally or alternatively be used. For example, fifty thousand update hubs may be used in connection with fifty thousand corresponding update locations. In some examples, multiple update hubs may be used at a single update location.

The example device manufacturer 102 of the illustrated example of FIG. 1 is a manufacturer of a device that receives an update (e.g., a software update, a firmware update, configuration data, an operating system update, a driver update, additional media for use by the device (e.g., new video game content such as a map), and/or any other information and/or instructions used to modify functionality of the device). In the illustrated example of FIG. 1, the example device manufacturer 102 is an entity that physically produces the device. However, in some examples, the device manufacturer 102 may be an entity that does not physically produce the device but, instead, designs, oversees the production of, provides software and/or firmware for, and/or is otherwise involved in the sale and/or service of a device. Instead of providing an update directly to the device (e.g., device 120, 122, 124) via, for example, a unicast transmission, the example device manufacturer 102 of the illustrated example of FIG. 1 provides the update to the update distributor 105 such that the update can be broadcast to the update hub 115 and then transmitted locally to the device. In examples disclosed herein, the update hub 115 transmits the update to the device using a unicast transmission. However, any other approach for transmitting the update from the update hub 115 to the device may additionally or alternatively be used such as, for example, multicast transmission, broadcast transmission, etc.

The example update distributor 105 of the illustrated example of FIG. 1 includes a manufacturer interface 130, a device ID data store 135, an update data store 140, a broadcaster 145, and a local device information receiver 150. In examples disclosed herein, the update distributor 105 is implemented by a server operated by a satellite media provider providing satellite media to the update location 110 (e.g., DirecTV®). However, the update distributor 105 may be implemented and/or operated in any other fashion.

The example manufacturer interface 130 of the example update distributor of FIG. 1 receives an update package (e.g., a set of instructions, an executable file, etc.) including the update to be distributed to devices identified by the device manufacturer 102. As noted above, the update may include, for example, a software application update, a firmware update, configuration data, an operating system update, a driver update, additional media for use by the device (e.g., new video game content such as a map), and/or any other information and/or instructions used to modify functionality of the device. In examples disclosed herein, the example manufacturer interface 130 is accessible using a web page. However, any other past, present, and/or future approach to receiving an update package from a manufacturer may additionally or alternatively be used. For example, the manufacturer 102 may provide the update to the update distributor 105 via a storage disk or storage device (e.g., a hard disk drive).

The example device ID data store 135 of the example update distributor of FIG. 1 stores device identifiers identifying devices to which an update received from the device manufacturer 102 is applicable. In examples disclosed herein, the example device ID data store 135 may be any device for storing data such as, for example, flash memory, magnetic media, optical media, etc. Furthermore, the data stored in the example device ID data store 135 may be in any format such as, for example, binary data, comma separated data, tab delimited data, structured query language (SQL) structures, etc. While, in the illustrated example, the example device ID data store 135 is illustrated as a single database, the example device ID data store 135 may be implemented by any number and/or type(s) of database(s).

The example update data store 140 of the example update distributor of FIG. 1 stores update package(s) (e.g., a set(s) of instructions, an executable file, etc.) to be delivered to the devices identified by the device IDs stored in the example device ID data store 135. In examples disclosed herein, the example update data store 140 may be any device for storing data such as, for example, flash memory, magnetic media, optical media, etc. Furthermore, the data stored in the example update data store 140 may be in any format such as, for example, binary data, comma separated data, tab delimited data, structured query language (SQL) structures, etc. While, in the illustrated example, the example update data store 140 is illustrated as a single database, the example update data store 140 may be implemented by any number and/or type(s) of database(s).

The example broadcaster 145 of the example update distributor 105 of FIG. 1 broadcasts an update schedule (e.g., a virtual update guide) and an update (according to the update schedule) via the satellite 108 to the update hub 115. In examples disclosed herein, the update schedule is developed by the broadcaster 145 and identifies upcoming broadcasts of updates and devices to which those update(s) is applicable. An example update schedule is disclosed in further detail in connection with FIG. 5. In examples disclosed herein, the example update schedule is broadcast periodically and identifies updates scheduled to be broadcast and a channel over which the updates will be broadcast at a future time (e.g., over the next two weeks). However, any other approach to providing the update schedule to the update hub 115 may additionally or alternatively be used. For example, to conserve satellite broadcast resources, the example update schedule may be transmitted via, for example the Internet 190 on an as-requested basis.

In examples disclosed herein, the example broadcaster 145 develops the update schedule based on updates recently received from the device manufacturer 102. However, any other information may be used when developing the update schedule such as, for example, information concerning current software versions of devices identified by the update hub 115. For example, if an update hub identified that a particular device was using a first version of software, the example broadcaster might schedule a second version of the software to be broadcast for update to the device.

The example local device information receiver 150 of the example update distributor of FIG. 1 receives, from the example update hub 115, information concerning, for example, devices identified on the network 118, updates applied by the update hub 115, etc. In the illustrated example of FIG. 1, the information is received via the Internet 190. However, any other past, present, and/or future approach to transmitting data from the update hub 115 to the local device information receiver 150 may additionally or alternatively be used. In the illustrated example of FIG. 1, information received by the local device information receiver 150 facilitates creation of the virtual update guide by the broadcaster 145. In some examples, the information received by the local device information receiver 150 may additionally or alternatively be used to identify device manufacturers whose devices are present on networks with update hubs. For example, if many update hubs detected the presence of a device associated with a particular manufacturer, such information might suggest that communications overhead(s) associated with delivery of updates using traditional update techniques could be reduced by utilizing the update distributor 105.

The example update distributor 105 transmits information to the update hub 115 via the satellite 108. In examples disclosed herein, the example satellite 108 is a satellite in a geosynchronous orbit about the Earth. However, any other type of satellite and/or orbit may additionally or alternatively be used. In examples disclosed herein, the example satellite 108 facilitates a broadcast of information from the broadcaster 145 of the example update distributor 105 to the update hub 115 via the satellite dish 111. However, any other type of information broadcast system may additionally or alternatively be used such as, for example, a terrestrial broadcast system, an internet protocol (IP) television distribution system, a cable television distribution system, etc.

The example update location 110 of the illustrated example of FIG. 1 is a residence of a user (e.g., a user of the satellite media service provided by the satellite media provider). However, the example update location 110 may be any other location such as, for example, a commercial location (e.g., a store, a coffee shop, a workplace, a hospital, etc.). Use of the example update hub 115 at the update location 110 where devices to be updated (e.g., the devices 120, 122, 124) are typically present increases the likelihood that those devices will be present to receive an update. In some examples, the devices to be updated are present at the update location 110 for long periods of time (e.g., during business hours at a workplace, overnight at home, permanently installed at a location, etc.). However, in some other examples, the devices to be updated are present at the update location 110 for short periods of time (e.g., one hour while shopping at a store, ten minutes while placing an order at a coffee shop, five minutes while passing through a public transit station, etc.).

In the illustrated example of FIG. 1, the satellite dish 111, the update hub 115, the network 118, and the devices 120, 122, 124 are present at the example update location 110. The example satellite dish 111 receives satellite communications from the satellite 108. In some examples, the satellite dish 111 processes the satellite communications received from the satellite 108 (e.g., amplifies the communications, performs error correction and/or detection, etc.) before providing the satellite communications to the update hub 115.

The example update hub 115 of the illustrated example of FIG. 1 includes a satellite receiver 160, a schedule processor 165, a local network device identifier 170, a local device ID data store 175, a local update data store 180, and an update communicator 185. In examples disclosed herein, the example update hub 115 is a stand-alone unit implemented at the update location 110. However, in some examples, the example update hub 115 may be implemented as a component of a satellite system present at the example update location 110 such as, for example, a satellite digital video recorder (DVR).

In the illustrated example of FIG. 1, the example update hub 115 communicates information concerning, for example, devices identified on the network 118, updates applied by the update hub 115, etc. to the local device information receiver 150 via, for example, the Internet 190. While the Internet 190 is used in the illustrated example of FIG. 1 to transmit such information to the local device information receiver 150, any other approach to transmitting information to the local device information receiver 150 may additionally or alternatively be used.

In examples disclosed herein, the example update hub 115 communicates via the network 118. The example network 118 of the illustrated example of FIG. 1 is a local area network (LAN). In examples disclosed herein, the network 118 includes a gateway 119 that enables communications of devices on the network 118 to reach the Internet 190. In examples disclosed herein, the example gateway 119 provides the network in a wireless fashion (e.g., as a WiFi network). However, in some examples, the example gateway 119 may provide a wired network and/or a combination of wired and wireless networks. In examples disclosed herein, the example network 118 utilizes an Internet protocol (IP) addressing scheme. As such, the devices 120, 122, 124 on the local network are each issued an IP address by the gateway 119 that identifies the device on the network 118. The example network 118 facilitates communication between the example update hub 115 and the devices 120, 122, 124 using, for example, an Ethernet protocol. However, any other past, present, and/or future communication protocol and/or system may be used for facilitating communication between the example update hub 115 and the example devices 120, 122, 124. For example, the update hub 115 may communicate with the devices 120, 122, 124 using, for example, a Bluetooth connection.

The example satellite receiver 160 of the illustrated example of FIG. 1 receives satellite communications via the satellite dish 111. In examples disclosed herein, the example satellite receiver 160 demodulates the satellite communications received via the satellite dish 111. The demodulated satellite communications are passed to the example schedule processor 165. In examples disclosed herein, the example satellite receiver 160 is included as a component of the update hub 115. However, in some examples, the example satellite receiver 160 may be implemented separately from the update hub 115. For example, the update hub 115 may be communicatively coupled to the satellite receiver 160 (e.g., the update hub 115 may be implemented as a dongle that is to be attached to the satellite receiver 160, the update hub 115 may be implemented as a separate unit that communicates with the satellite receiver 160 (e.g., via WiFi, via Ethernet, etc.)). In some examples, the update hub 115 and the satellite receiver 160 may form a client/server relationship.

The example schedule processor 165 of the illustrated example of FIG. 1 processes the demodulated satellite communications received from the example satellite receiver 160. In examples disclosed herein, the satellite communications includes the update schedule (e.g., the schedule describing when updates will be broadcast for different types of devices) and update broadcasts. The example schedule processor 165 inspects the update schedule to determine when, in view of devices identified on the network 118 by the local network device identifier 170, to record the broadcasted updates. In examples disclosed herein, the schedule processor 165 records updates which are applicable to devices identified on the network 118 in the local update data store 180.

The example local network device identifier 170 of the illustrated example of FIG. 1 performs a network scan to identify devices (e.g., the device 120, 122, 124) that are in communication with the network 118. The example scan is performed by determining potential internal (e.g., private) IP addresses, and transmitting a message to the potential IP address(es). In the illustrated example, an Internet Control Message Protocol (ICMP) message (commonly referred to as a "ping") is used. However, any other type(s) and/or number of message(s) may addition ally or alternatively be used.

In some examples, when a device is discovered at the potential IP address (e.g., a response to the message is received), the example update hub 115 performs a lookup of a hardware address (e.g., a media access control address (MAC), a serial number, a name of the device, etc.) of the device communicating using the tested private IP address to identify the device responding at the tested IP address. In the illustrated example, the lookup is performed using an Address Resolution Protocol (ARP) table. However, any other approach to identifying the device responsive at the tested IP address may additionally or alternatively be used such as, for example, transmitting an interrogation message to the update client 121, 123, 125 to request the update client 121, 123, 125 to identify the device 120, 122, 124 with which it is associated. In some examples, the interrogation message additionally or alternatively queries the device to identify a current software, hardware, and/or firmware version of the device.

The example local device ID data store 175 of the illustrated example of FIG. 1 stores identifications of devices (e.g., the device 120, 122, 124) discovered by the local network device identifier 170. In examples disclosed herein, the hardware address of the device is stored in the local device ID data store 175. However, any other information may additionally or alternatively be stored in the local device ID data store 175 to identify the device such as, for example, the IP address at which the device was responsive, a timestamp identifying the time at which the device was detected, a software, hardware, and/or firmware version of the device, etc.

In examples disclosed herein, the example local device ID data store 175 may be any device for storing data such as, for example, flash memory, magnetic media, optical media, etc. Furthermore, the data stored in the example local device ID data store 175 may be in any format such as, for example, binary data, comma separated data, tab delimited data, structured query language (SQL) structures, etc. While, in the illustrated example, the example local device ID data store 175 is illustrated as a single database, the example local device ID data store 175 may be implemented by any number and/or type(s) of database(s).

The example local update data store 180 of the illustrated example of FIG. 1 stores updates recorded by the schedule processor 165 to be distributed to the device(s) (e.g., the device 120, 122, 124) on the network 118. In examples disclosed herein, the example local update data store 180 may be any device for storing data such as, for example, flash memory, magnetic media, optical media, etc. Furthermore, the data stored in the example local update data store 180 may be in any format such as, for example, binary data, comma separated data, tab delimited data, structured query language (SQL) structures, etc. While, in the illustrated example, the example local update data store 180 is illustrated as a single database, the example local update data store 180 may be implemented by any number and/or type(s) of database(s).

The example update communicator 185 of the illustrated example of FIG. 1 communicates an update stored in the local update data store 180 to a device (e.g., the device 120, 122, 124) via the network 118. In examples disclosed herein, the example update communicator 185 communicates with the update client 121, 123, 125 of the respective device 120, 122, 124 to transmit the update. However, the example update communicator 185 may communicate with any other functionality of the device 120, 122, 124 (e.g., an operating system, a package manager, etc.) to transmit the update. In examples disclosed herein, the update communicator 185 transmits the update to the device without user interaction at the device. For example, a prompt is not displayed to the user of the device requesting approval of the update. Not prompting a user for permission to apply an update is advantageous because devices that might be updated might not frequently receive user input. Applying an update without regard to user input ensures that updates to devices that a user might not interact with are applied in a timely fashion. However, in some examples, user interaction at the device may be required to ensure that a user approves installation of the update, and/or authorizes a time at which the update is installed.

In examples disclosed herein, the update is transmitted by providing an indication that an update is available and providing an address of the update hub 115 where the update can be retrieved by the device 120, 122, 124. The device 120, 122, 124 may then retrieve the update from the update communicator 185 (e.g., at a time that is convenient to the device 120, 122, 124). However, any other approach to transmitting the update to the device 120, 122, 124 may additionally or alternatively be used. In some examples, the update communicator 185 stores a record indicative of updates that have already been provided to and/or applied by the device. Recording such information enables the update hub 115 to communicate updates that have not yet been applied to the device and/or ensure that the device is not inadvertently downgraded.

The example devices 120, 122, 124 of the illustrated example of FIG. 1 are consumer electronics devices such as, for example, a smart phone, a gaming console, a media presenter, an Internet of Things (IoT) device, etc. However, the example devices 120, 122, 124 of FIG. 1 may be implemented by any other type of device(s) such as, for example, medical equipment, vehicles (e.g., a vehicle computer system). In the illustrated example of FIG. 1 the example devices 120, 122, 124 are devices that are not traditionally part of a satellite media distribution system. That is, the devices 120, 122, 124 are not satellite media set top boxes and do not present media received via a satellite broadcast.

In the illustrated example of FIG. 1, each of the devices 120, 122, 124 includes an update client 121, 123, 125. The example update client 121, 123, 125 communicates with the update communicator 185 of the example update hub 115 to, for example, provide status information concerning the device 120, 122, 124 (e.g., a current software version of the device), receive an update from the update hub 115, etc. An example implementation of the update client 121, 123, 125 and/or more generally the example device 120, 122, 124 is described below in connection with FIG. 2.

Figure 2:
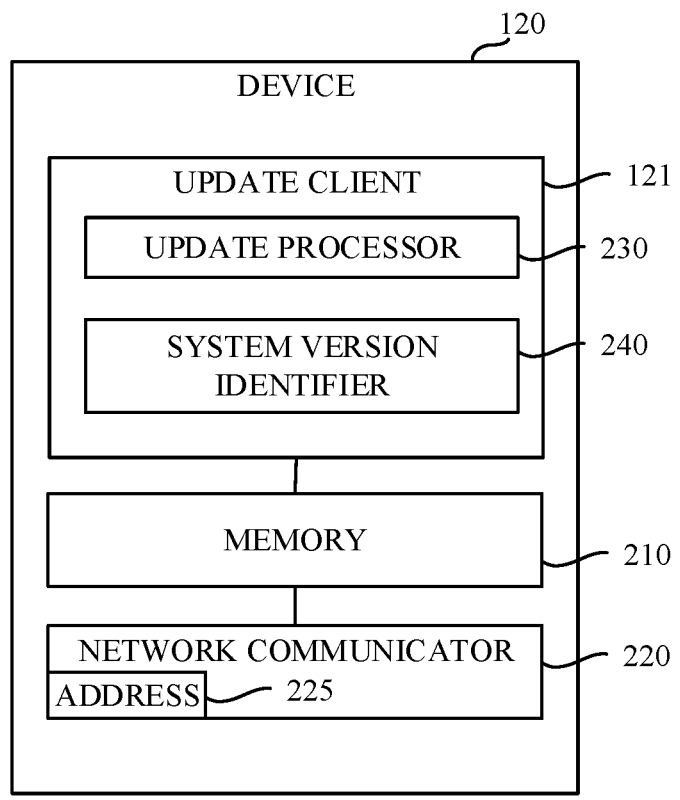
FIG. 2 is a block diagram of an example implementation of the example device of the illustrated example of FIG. 1.

FIG. 2 is a block diagram of an example implementation of the example 120 device of the illustrated example of FIG. 1. In the illustrated example of FIG. 2, the example device 120 includes an update client 121, a memory 210, and a network communicator 220. In the illustrated example of FIG. 2, the example device 120 is an Internet of Things (IoT) device manufactured by the device manufacturer 102. The example device 120 of the illustrated example of FIG. 2 is a consumer electronics device such as, for example, a smart phone, a gaming console, a set top box, an Internet of Things (IoT) device, etc. However, the example device 120 of FIG. 2 may be implemented by any other type of device(s) such as, for example, medical equipment, vehicles.

The example update client 121 of the illustrated example of FIG. 2 is installed in the device 120 at a time of manufacture of the device 120. However, in some examples, the example update client 121 may be installed at a time after manufacture of the device 120 such as, for example, when the device 120 is installed in the update location. In the illustrated example of FIG. 2, the example update client 121 includes an update processor 230 and a system version identifier 240. The example update client 121 communicates with the update hub 115 via the network communicator 220 to provide version information identified by the system version identifier 240. When an update is available, the example update processor 230 ensures that enough of the memory 210 is available for storing the update, the example update processor 230 receives the update from the update hub 115, stores the update in the memory 210, and applies the update.

The example system version identifier 240 of the illustrated example of FIG. 2 detects a version of software and/or firmware operated by the device 120. In examples disclosed herein, the example system version identifier 240 accesses a location in the memory 210 to detect the version of software and/or firmware operated by the device 120. However, any other approach to detecting a version of software and/or firmware operated by the device 120 may additionally or alternatively be used. For example, the example local network device identifier 170 of the example update hub 115 may store records identifying which updates have been applied to which device to maintain an indication of the current version of software and/or firmware operated by the device 120.

The example memory 210 of the illustrated example of FIG. 2 stores executable instructions executed by the device 120. In examples disclosed herein, the executable instructions are provided by the device manufacturer 102 to enable the device 120 to perform a function for which the device was intended (e.g., a thermostat may provide a temperature control function, a smart television may perform a media presentation function, etc.). In examples disclosed herein, the example memory 210 may be any device for storing data such as, for example, flash memory, magnetic media, etc.

The example network communicator 220 of the illustrated example of FIG. 2 communicates via the network 118. In examples disclosed herein, the network communicator 220 is a wireless module (e.g., WiFi module) that enables wireless communication with the network 118. However, in some examples, the network communicator 220 may be implemented as a wired communication module such as, for example, an Ethernet network port. In the illustrated example of FIG. 2, the example network communicator 220 is identified using an address 225. In examples disclosed herein, the address 225 is a media access control (MAC) address. The MAC address is a serial number of the example network communicator 220. In examples disclosed herein, the MAC address does not change over time (unlike an IP address). The MAC address of the device 120 is assigned by the device manufacturer 102 at the time of manufacture. In examples disclosed herein, the address 225 (a MAC address) is represented as a forty-eight bit identifier, and is typically represented using twelve hexadecimal characters. Traditionally, the first six hexadecimal characters are reserved as a manufacturer identifier portion of the address 225 (referred to as an Organizationally Unique Identifier (OUI)), whereas the remaining six hexadecimal characters are used to uniquely identify the device 120. However, any other past, present, and/or future device addressing schemes may additionally or alternatively be used.

Figure 3:
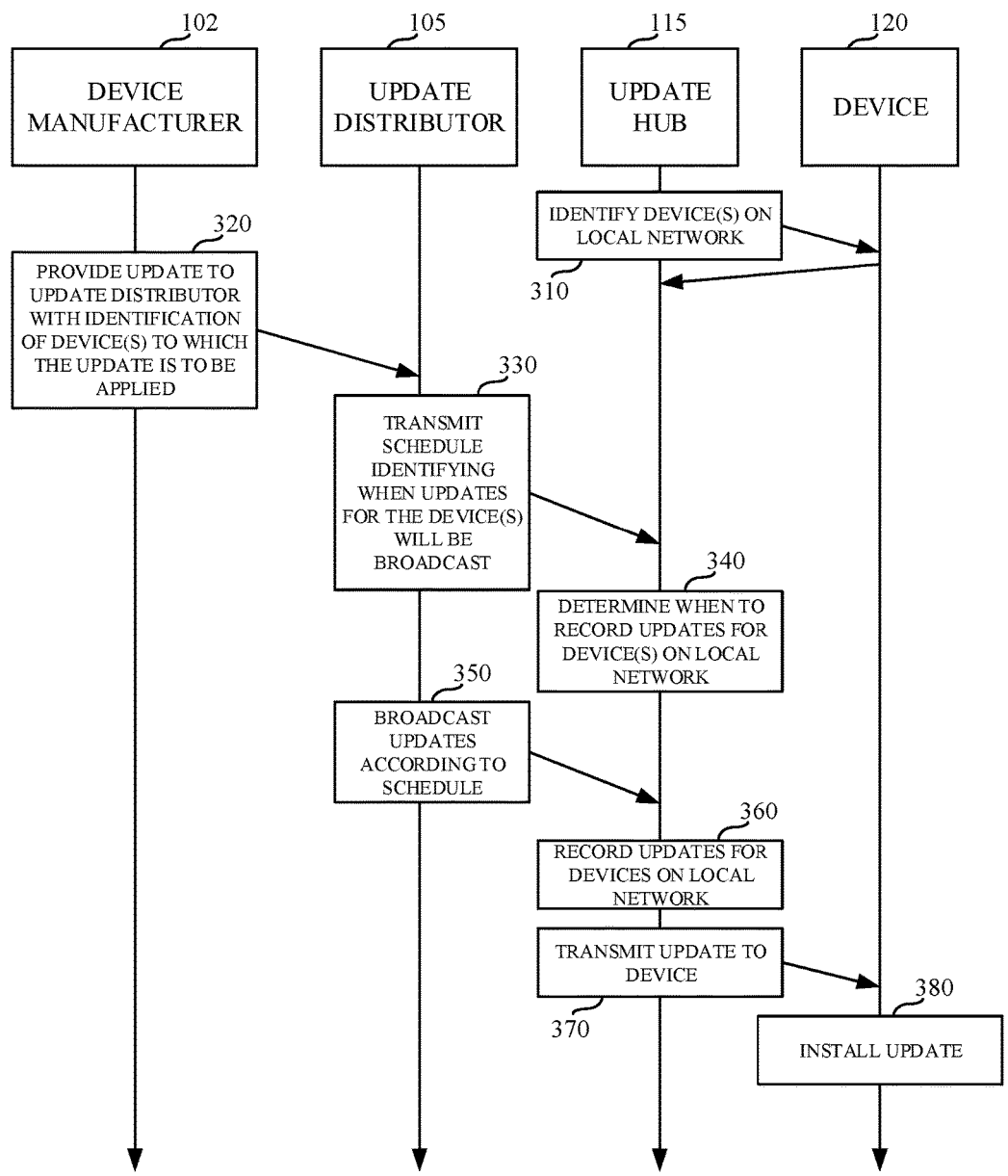
FIG. 3 is a communication diagram illustrating example communications between the example device manufacturer, the example update distributor, the example update hub, and the example device of FIG. 1.

FIG. 3 is a communication diagram illustrating example communications between the example device manufacturer 102, the example update distributor 105, the example update hub 115, and the example device 120 of FIG. 1. The example communication diagram begins when the example update hub 115 identifies device(s) on the local network 118 (Block 310). In examples disclosed herein, the example update hub 115 identifies device(s) on the local network 118 by performing a scan of the network 118. In the illustrated example, the scan is triggered on a periodic basis (e.g., after a threshold time has elapsed since a prior scan such as, for example, fifteen minutes, two hours, three days, etc.). However, the scan may be triggered in any other periodic and/or aperiodic fashion. To begin the scan, the example update hub 115 determines a private IP address of the update hub 115. Many home routers (e.g., the gateway 119, a device hosting the network 118, etc.) utilize a dynamic host control protocol (DHCP) to allocate private IP addresses using a single subnet (e.g., a subnet containing private IP address from 192.168.254.0 through 192.168.254.255). To avoid scanning all potential private IP addresses, the example update hub 115 selects a subnet that includes the private IP address of the update hub 115. The example update hub 115 then probes other potential IP addresses within the subnet using an ICMP Echo request (commonly referred to as a "ping"), and awaits a response to each request. Based on the received responses, the example update hub 115 aggregates a list of devices on the network 118. In some examples, the update hub 115 further interrogates the device 120 to identify further information such as, for example, a current system version of the device 120.

In the illustrated example of FIG. 3, the example device manufacturer 102 provides an update to the update distributor 105 with an identification of device(s) to which the update is to be applied (Block 320). In examples disclosed herein, the devices are identified using hardware addresses such as, for example MAC addresses. However, the devices may be identified in any other fashion.

The example update distributor 105 generates an update schedule (i.e., a virtual update guide) to be broadcast to the update hub 115 that identifies times at which the update(s) received from the device manufacturer 102 will be broadcast. The schedule is then broadcast (Block 330), via satellite, to the update hub 115. The update hub 115 reviews the schedule to determine when updates will be broadcast for devices identified on the network 118 (e.g., devices identified in connection with block 310) (Block 340).

The example update distributor 105 broadcasts updates according to the schedule (e.g., the schedule distributed in connection with block 330) (Block 350). Based on the review of the schedule and the identification of devices on the network, the example update hub 115 records the broadcasted update for device(s) on the network 118 (Block 360). The updates can then be transmitted to the update client (e.g., the update client 121) of the device (e.g., the device 120) (Block 370). The update client then installs and/or applies the update (Block 380).

While the illustrated example of FIG. 3 is shown as a serial process, portions of the example communication diagram of FIG. 3 may be performed out of the example order illustrated in FIG. 3. For example, the example update hub 115 may identify device(s) on the network 118 multiple times (e.g., upon receipt of the schedule broadcast in connection with block 330, periodically, etc.). In some examples, the example update distributor 105 may broadcast the update multiple times according to the schedule such that there are multiple opportunities for the update hub 115 to record the update in connection with block 360.

While example manner(s) of implementing the example update distributor 105, the example update hub 115, and/or the update client 121 are illustrated in FIGS. 1 and/or 2, one or more of the elements, processes and/or devices illustrated in FIGS. 1 and/or 2 may be combined, divided, re-arranged, omitted, eliminated and/or implemented in any other way. Further, the example manufacturer interface 130, the example device ID data store 134, the example update data store 140, the example broadcaster 145, the example local device information receiver 150, and/or more generally, the example update distributor 105 of FIG. 1, the example satellite receiver 160, the example schedule processor 165, the example local network device identifier 170, the example local device ID data store 175, the example local update data store 180, the example update communicator 185, and/or, more generally, the example update hub 115 of FIG. 1, the example update processor 230, the example system version identifier 240, and/or, more generally, the example update client 121 of FIGS. 1 and/or 2 may be implemented by hardware, software, firmware and/or any combination of hardware, software and/or firmware. Thus, for example, any of the example manufacturer interface 130, the example device ID data store 134, the example update data store 140, the example broadcaster 145, the example local device information receiver 150, and/or more generally, the example update distributor 105 of FIG. 1, the example satellite receiver 160, the example schedule processor 165, the example local network device identifier 170, the example local device ID data store 175, the example local update data store 180, the example update communicator 185, and/or, more generally, the example update hub 115 of FIG. 1, the example update processor 230, the example system version identifier 240, and/or, more generally, the example update client 121 of FIGS. 1 and/or 2 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example manufacturer interface 130, the example device ID data store 134, the example update data store 140, the example broadcaster 145, the example local device information receiver 150, and/or more generally, the example update distributor 105 of FIG. 1, the example satellite receiver 160, the example schedule processor 165, the example local network device identifier 170, the example local device ID data store 175, the example local update data store 180, the example update communicator 185, and/or, more generally, the example update hub 115 of FIG. 1, the example update processor 230, the example system version identifier 240, and/or, more generally, the example update client 121 of FIGS. 1 and/or 2 is/are hereby expressly defined to include a tangible computer readable storage device or storage disk such as a memory, a digital versatile disk (DVD), a compact disk (CD), a Blu-ray disk, etc. storing the software and/or firmware. Further still, the example update distributor 105 of FIG. 1, the example update hub 115 of FIG. 1, and/or the example update client 121 of FIGS. 1 and/or 2 may include one or more elements, processes and/or devices in addition to, or instead of, those illustrated in FIGS. 1 and/or 2, and/or may include more than one of any or all of the illustrated elements, processes and devices.

Figure 4:
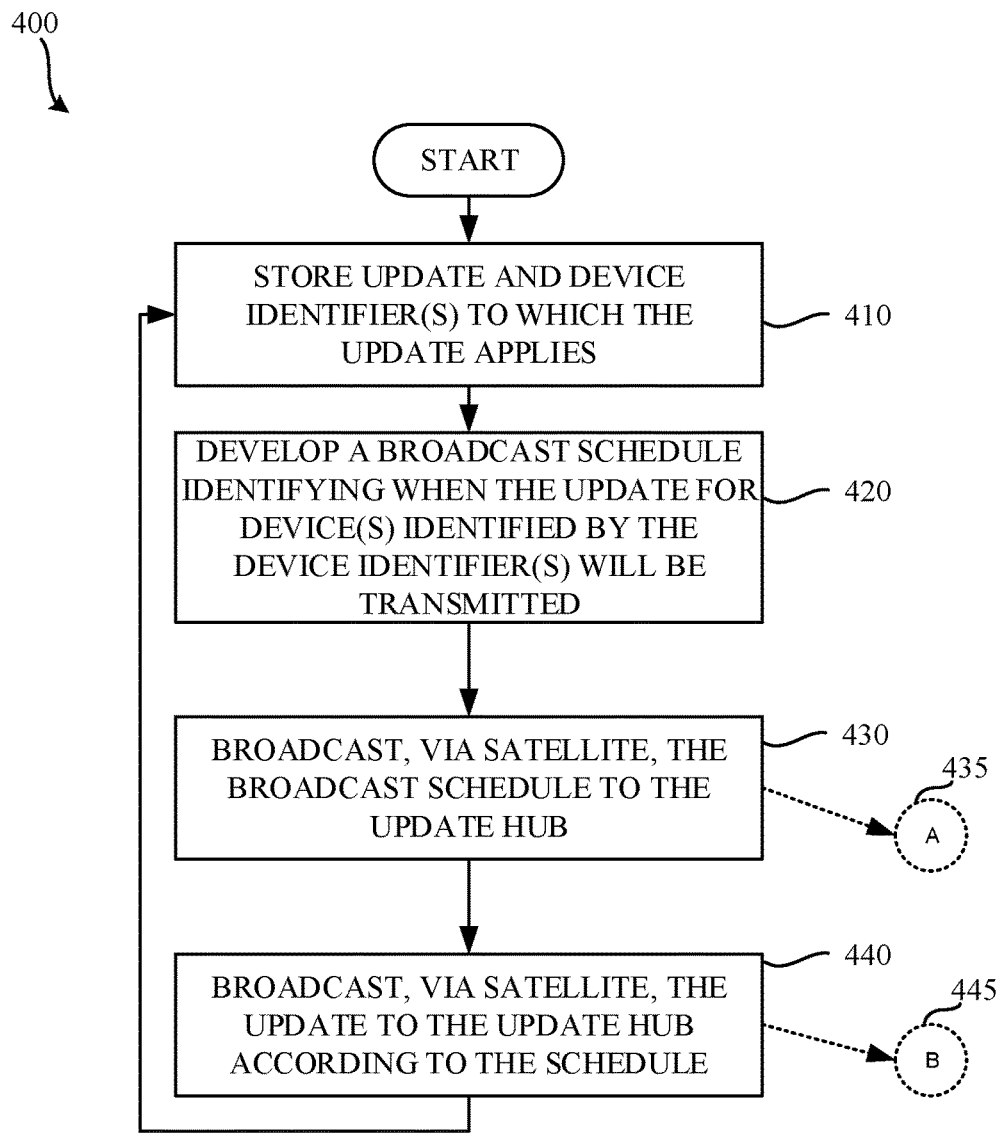
FIG. 4 is a flowchart representative of example machine-readable instructions which, when executed, cause the example update distributor of FIG. 1 to provide an update via a satellite connection.
Figure 6:
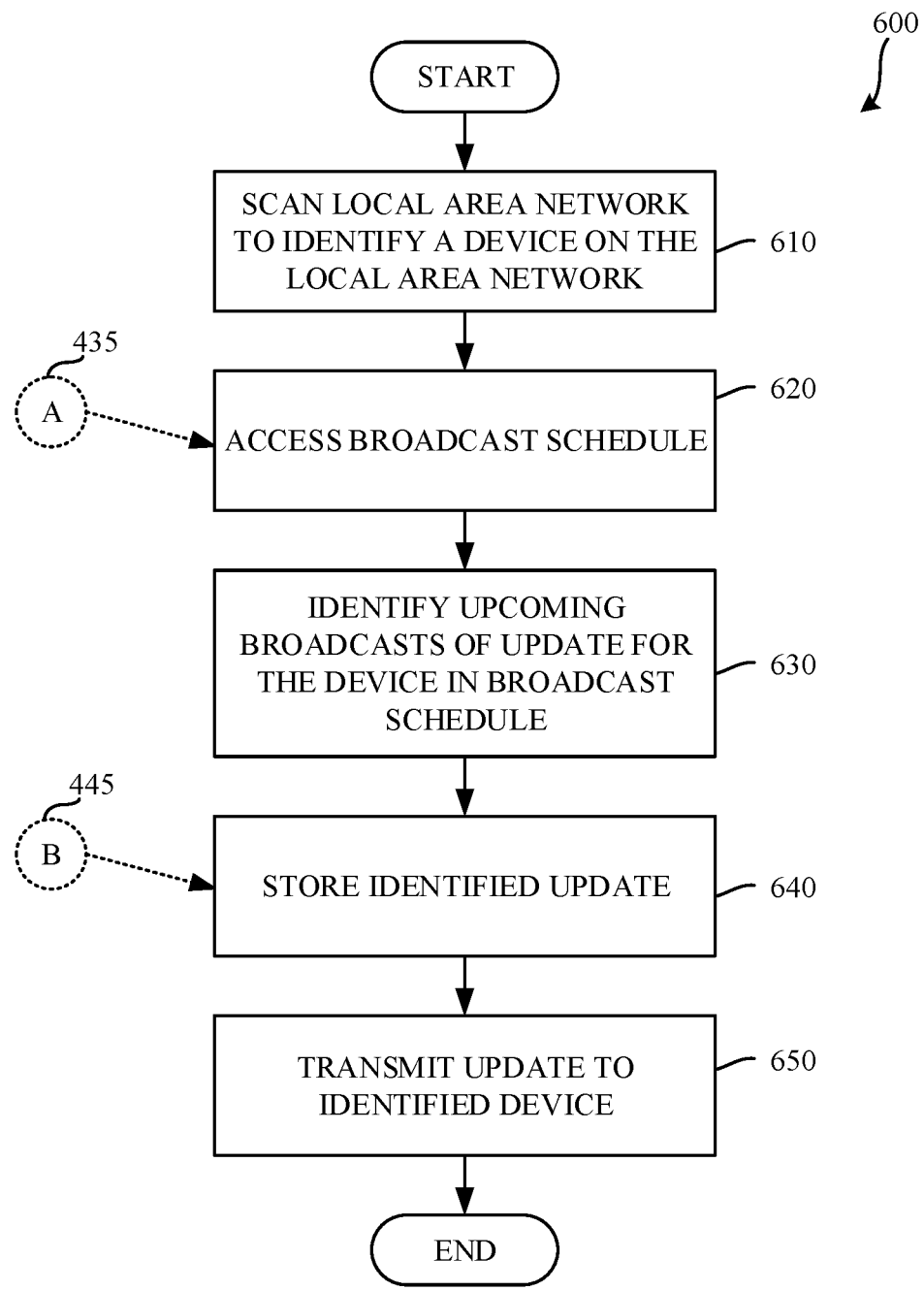
FIG. 6 is a flowchart representative of example machine-readable instructions which, when executed, cause the example update hub of FIG. 1 to receive an update and forward the update to a device to which the update is applicable.

A flowchart representative of example machine readable instructions for implementing the example update distributor 105 of FIG. 1 is shown in FIG. 4. Flowcharts representative of example machine readable instructions for implementing the example update hub 115 of FIG. 1 are shown in FIGS. 6 and/or 7. A flowchart representative of example machine readable instructions for implementing the example update client 121 of FIGS. 1 and/or 2 is shown in FIG. 8. In these examples, the machine readable instructions comprise a program(s) for execution by a processor(s) such as the processor(s) 912, 1012, 1112 shown in the example processor platform(s) 900, 1000, 1100 discussed below in connection with FIGS. 9, 10, and/or 11. The program(s) may be embodied in software stored on a tangible computer readable storage medium such as a CD-ROM, a floppy disk, a hard drive, a digital versatile disk (DVD), a Blu-ray disk, or a memory associated with the processor(s) 912, 1012, 1112, but the entire program and/or parts thereof could alternatively be executed by a device other than the processor(s) 912, 1012, 1112 and/or embodied in firmware or dedicated hardware. Further, although the example program(s) is/are described with reference to the flowchart(s) illustrated in FIGS. 4, 6, 7, and/or 8, many other methods of implementing the example update distributor 105, the example update hub 115, and/or the example update client 121 of FIGS. 1 and/or 2 may alternatively be used. For example, the order of execution of the blocks may be changed, and/or some of the blocks described may be changed, eliminated, or combined.

As mentioned above, the example processes of FIGS. 4, 6, 7, and/or 8 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 4, 6, 7, and/or 8 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 4 is a flowchart representative of example machine-readable instructions 400 which, when executed, cause the example update distributor 105 of FIG. 1 to provide an update via a satellite connection. As noted above, the update may include, for example, a software application update, a firmware update, configuration data, an operating system update, a driver update, additional media for use by the device (e.g., new video game content such as a map), and/or any other information and/or instructions used to modify functionality of the device. The program of FIG. 4 begins at block 410 when the example manufacturer interface 130 stores an update and device identifiers to which the update is applicable in the example update data store 140 and the example device ID data store 135, respectively (Block 410). In examples disclosed herein, the update and device identifier(s) are received from the device manufacturer 102. However, the update and/or device identifiers may be received from any other party (e.g., a software developer, etc.) In examples disclosed herein, the update is provided as a binary file that can be applied to the device 120, 122, 124 using the update client 121, 123, 125. However, the update may be provided using any other past, present, and/or future format. In examples disclosed herein, the device identifier(s) are media access control (MAC) addresses. However, any other past, present, and/or future device identifier(s) may additionally or alternatively be used. In some examples, the device identifier(s) are provided individually (e.g., device A, device B, device C, device D). In some examples, the device identifiers are provided as a range of device identifiers (e.g., devices A through D).

The example broadcaster 145 develops an update schedule (e.g., a virtual update guide) identifying when the update for the device(s) identified by the device identifier(s) will be broadcast (Block 420). In examples disclosed herein, updates are scheduled for broadcast based on, for example, a number of devices to which the update is applicable and/or has not yet been applied (e.g., an update to be delivered to ten thousand devices might be scheduled to be broadcast more frequently than an update to be delivered to fifty devices), an age of the update (e.g., an update received one week ago that has not yet been broadcast might be scheduled to be broadcast in advance of an update received yesterday), a size of the update (e.g., an upload that is less than one megabyte might be scheduled to be broadcast in advance of an update that is one gigabyte), an urgency of the update (e.g., an update that fixes a critical security vulnerability might be scheduled to be broadcast in advance of an update that provides a new feature), etc. In some examples, information received via the local device information receiver 150 is used to assist in development of the update schedule.

Figure 5:
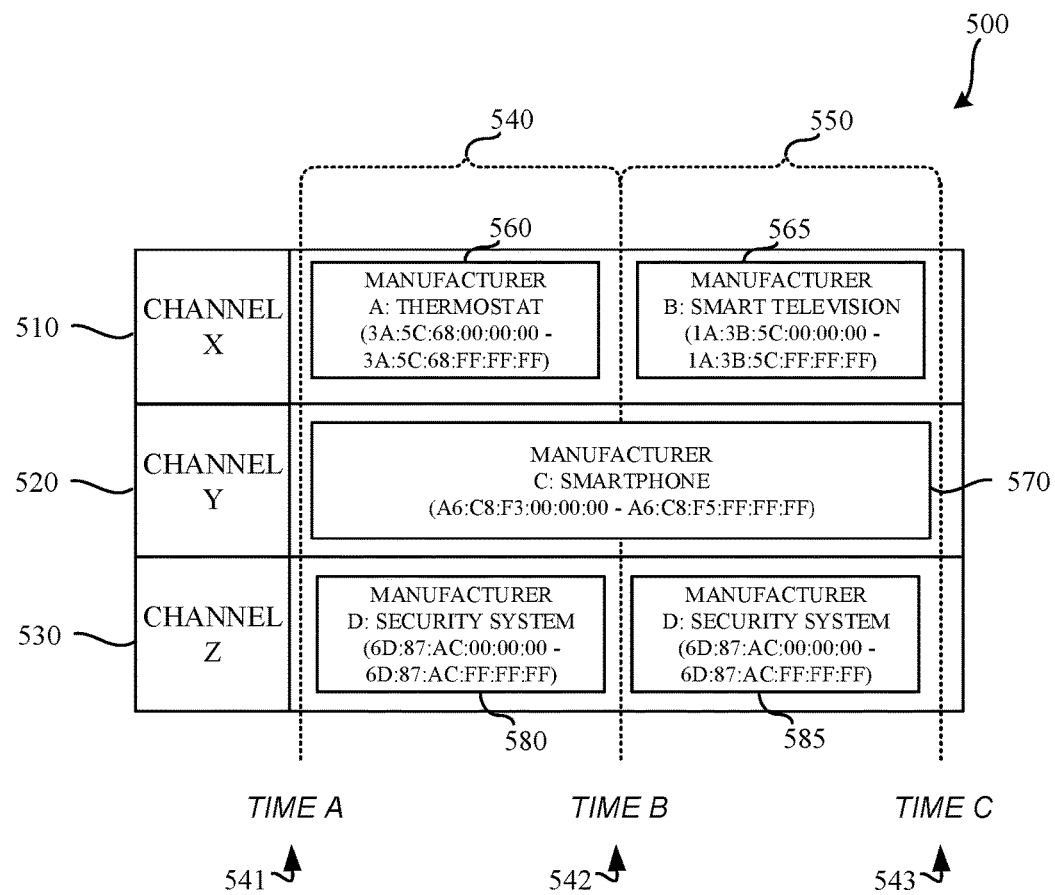
FIG. 5 is an example update schedule that may be broadcast by the example update distributor of FIG. 1.

FIG. 5 is an example update schedule 500 that may be broadcast by the example update distributor 105 of FIG. 1. In the illustrated example of FIG. 5, the example update schedule 500 identifies three broadcast channels: Channel X 510, Channel Y 520, and Channel Z 530. While in the illustrated example of FIG. 5, three channels are shown, any number of channels may additionally or alternatively be used. The example schedule 500 identifies updates for broadcast across two time periods: a first time period 540 between Time A 541 and Time B 542, and a second time period 550 between Time B 542 and Time C 543. In the illustrated example of FIG. 5, the first time period 540 and the second time period 550 have a same duration. However, in some examples, the first time period 540 and the second time period 550 have a different duration. The example schedule 500 of FIG. 5 identifies five updates: a first update 560, a second update 565, a third update 570, a fourth update 580, and a fifth update 585. In the illustrated example of FIG. 5, the example schedule 500 identifies broadcasts to occur over two time periods. However, in practice, the example schedule 500 may identify updates to be broadcast further into the future. For example, the update schedule 500 may represent updates to be broadcast over an upcoming day, two days, one week, two weeks, etc.

The first example update 560 is to be broadcast on the Channel X 510 during the first time period 540. The first example update 560 is an update applicable to a thermostat from manufacturer A having a device identifier within the range: 3A:5C:68:00:00:00-3A:5C:68:FF:FF:FF.

The second example update 565 is to be broadcast on the Channel X 510 during the second time period 565. The second example update 565 is an update applicable to a smart television from manufacturer B having a device identifier within the range: 1A:3B:5C:00:00:00-1A:3B:5C:FF:FF:FF.

The third example update 570 is to be broadcast on the Channel Y 520 during the first time period 540 and the second time period 550 (e.g., from the Time A 541 through the Time C 543). The third example update 570 is an update applicable to a smartphone from manufacturer C having a device identifier within the range: A6:C8:F3:00:00:00-A6:C8:F5:FF:FF:FF.

The fourth example update 580 is to be broadcast on the Channel Z 530 during the first time period 540. The fourth example update 580 is an update applicable to a security system from manufacturer D having a device identifier within the range: 6D:87:AC:00:00:00-6D:87:AC:FF:FF:FF. The fifth example 585 is to be broadcast during the second time period 550, and represents a re-broadcast of the fourth example update 580. In some examples, re-broadcasting an update is beneficial to ensure that the update is applied as quickly as possible (e.g., to address a security vulnerability). In some examples, a carousel is used to implement the recurring broadcast of the update. For example, the update may be broadcast a number of times at a prescribed interval (e.g., broadcast the update every four hours for the next ten days).

Returning to FIG. 4, upon creation of the update schedule, the broadcaster 145 broadcasts (Block 430), via the satellite 108, the update schedule to the update hub 115 (Circle 435). In examples disclosed herein, the update schedule includes an indication of when an update will be broadcast, and device identifiers to which it is applicable. The broadcaster 145 broadcasts (Block 440), via the satellite 108, the update(s) according to the update schedule to the update hub 115 (Circle 445). The process of FIG. 4 then repeats.

FIG. 6 is a flowchart representative of example machine-readable instructions which, when executed, cause the example update hub 115 of FIG. 1 to receive an update and forward the update to a device 120 to which the update is applicable. The example process 600 of FIG. 6, begins when the local network device identifier 170 scans the network 118 to identify devices on the network 118 (Block 610). In the illustrated example, the scan is triggered on a periodic basis (e.g., after a threshold time has elapsed such as, for example, fifteen minutes, two hours, three days, etc.) from previous scan. However, the scan may be triggered in any other periodic and/or aperiodic fashion.

To perform the scan, the example local network device identifier 170 determines a private IP address of the local network device identifier 170. Many home routers (e.g., the example gateway 119) allocate private IP addresses using a single subnet (e.g., a subnet containing private IP address from 192.168.1.0 through 192.168.1.255). As such, to avoid scanning all potential private IP addresses (e.g., private IP addresses that are outside of the range from 192.168.1.0 through 192.168.1.255), the example local network device identifier 170 selects a subnet that includes the private IP address of the local network device identifier 170. The example local network device identifier 170 transmits an ICMP Echo request (commonly referred to as a "ping") via the network 118 (and/or the gateway 119) to the potential IP address(es), and awaits a response to each request. If the response is received from the tested IP address, the example local network device identifier 170 performs a lookup of a hardware address (e.g., a media access control address (MAC), a serial number, a name of the device, etc.) of the device communicating using the tested IP address. In the illustrated example, the lookup is performed using an Address Resolution Protocol (ARP) table. However, any other approach to detecting a hardware address of a device on a network and/or, more generally, scanning a network, may additionally or alternatively be used. In examples disclosed herein, the detected device identifier is stored in the local device ID data store 175.

The example schedule processor 165 accesses the update schedule (Block 620) received from the broadcaster 145 (see circle 435 of FIG. 4). The example schedule processor identifies an upcoming broadcast of an update for a device identified on the network 118 by the local device identifier 170. (Block 630). In examples disclosed herein, the upcoming broadcast is identified when it is accompanied by a whitelist of device identifiers that includes the device identifier of the device stored in the local device ID data store 175 by the local device identifier 170. Having identified a device for a which an update will be broadcast, the example satellite receiver 160 records the broadcast update (Block 640). In the illustrated example of FIG. 6, the recorded update is stored in the example local update data store 180. The update communicator 185 then transmits the recorded update to the applicable device 120 (and/or the update client 121 thereof) (Block 650), such that the update can be applied to the device 120.

Figure 7:
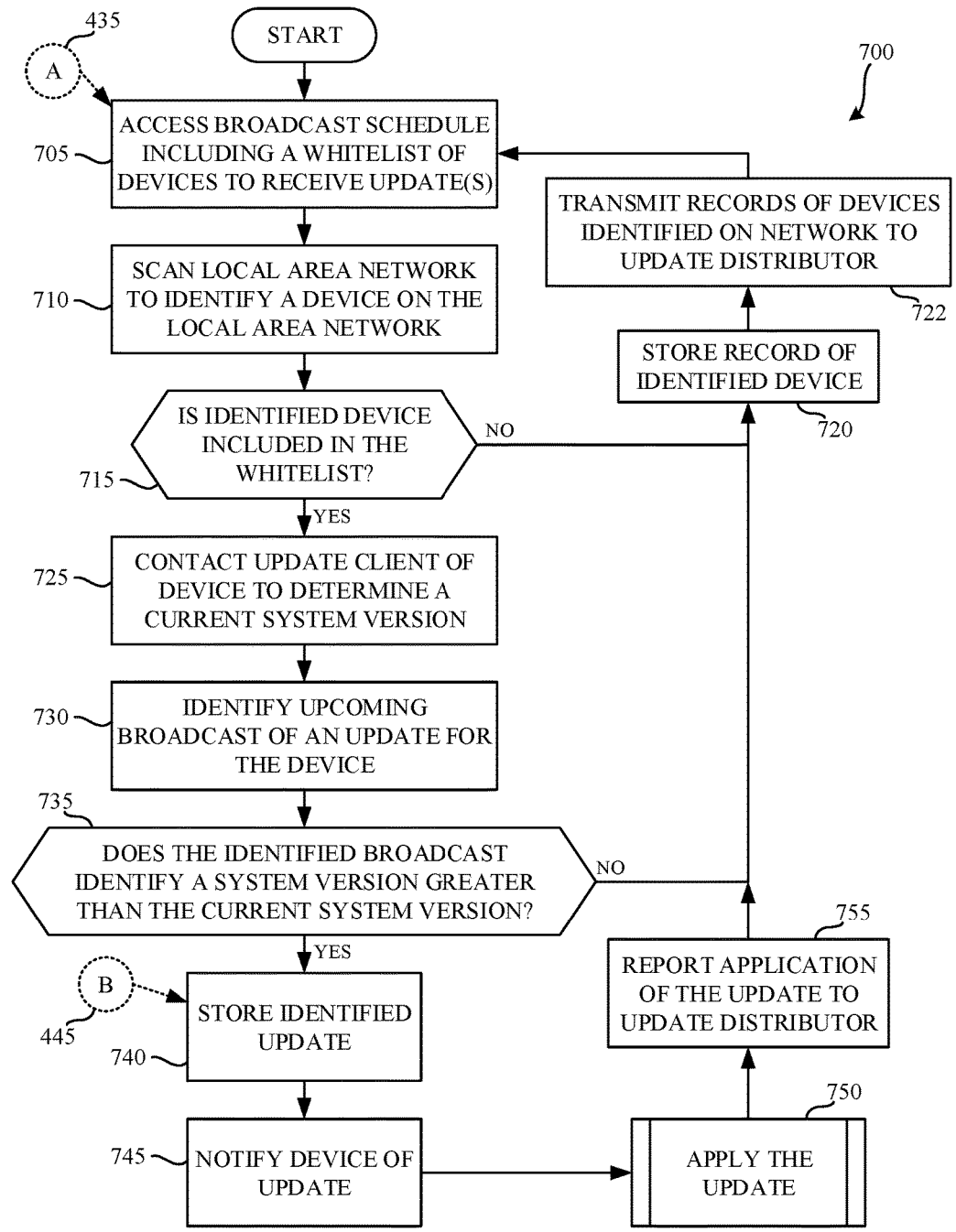
FIG. 7 is a flowchart representative of alternative example machine-readable instructions which, when executed, cause the example update hub of FIG. 1 to receive an update and forward the update to a device to which the update is applicable.
Figure 8:
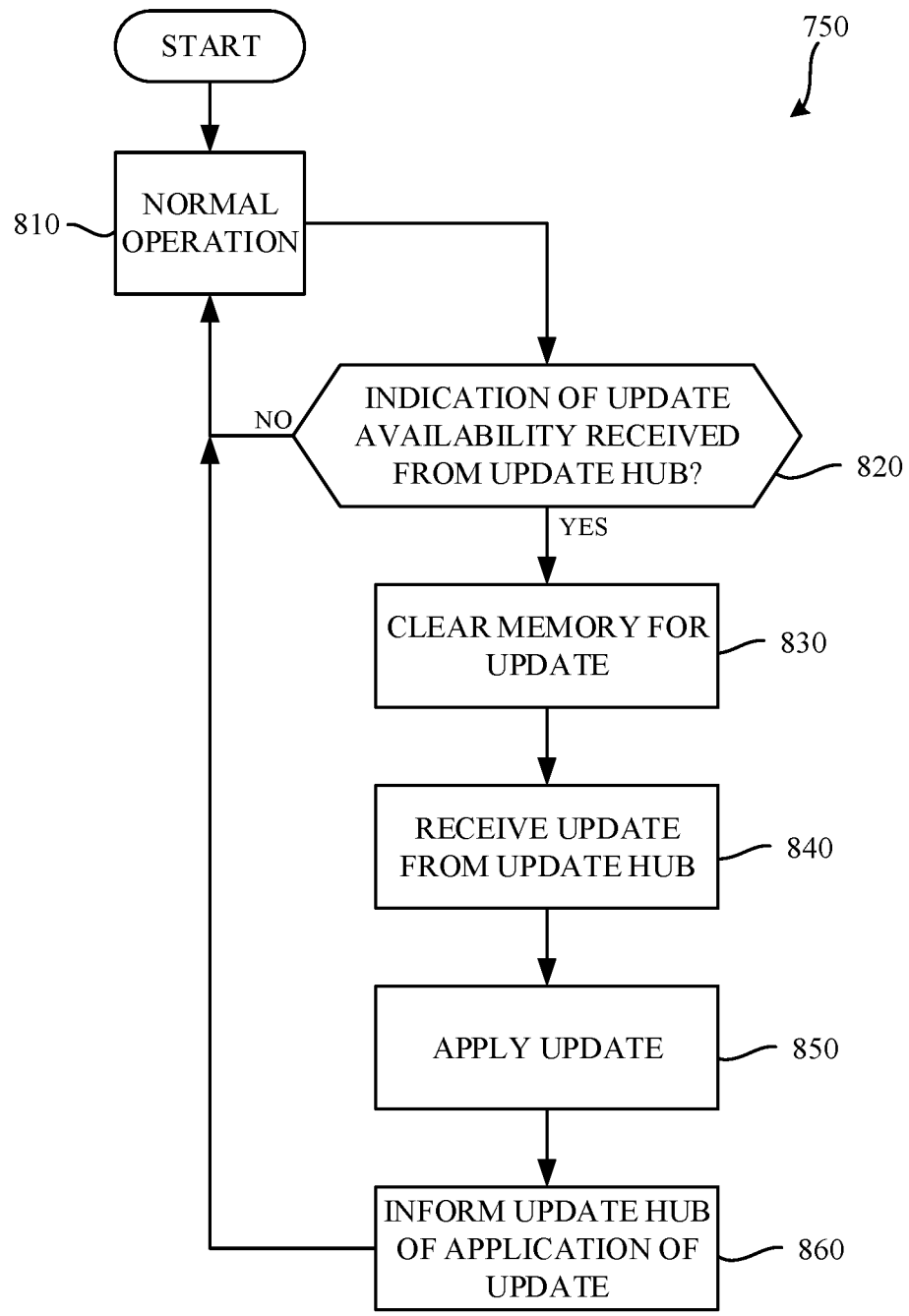
FIG. 8 is a flowchart representative of example machine-readable instructions which, when executed, cause the example update client of FIG. 1 to apply an update.

FIG. 7 is a flowchart representative of alternative example machine-readable instructions 700 which, when executed, cause the example update hub 115 of FIG. 1 to receive an update and forward the update to a device 120 to which the update is applicable. The example process 700 of FIG. 7 begins when the example schedule processor 165 accesses the update schedule (Block 705) received from the broadcaster 145 (see circle 435 of FIG. 4). In the illustrated example of FIG. 7, the update schedule includes a whitelist of all devices which might receive updates from the update distributor 105. In some examples, the whitelist identifies all devices that would receive an update according to the current update schedule. However, in some examples, the example whitelist identifies any devices that might receive an update, even if those devices are not included in the current update schedule.

The example local network device identifier 170 scans the network 118 to identify a device (e.g., the device 120, 122, 124) on the network 118 (Block 710). To perform the scan, the example local network device identifier 170 determines a private IP address of the local network device identifier 170. As noted above, many home routers (e.g., the example gateway 119) allocate private IP addresses using a single subnet (e.g., a subnet containing private IP address from 192.168.1.0 through 192.168.1.255). The example local network device identifier 170 transmits an ICMP Echo request (commonly referred to as a "ping") via the network 118 (and/or the gateway 119) to the potential IP address(es), and awaits a response to each request. If the response is received from the tested IP address, the example local network device identifier 170 performs a lookup of a hardware address (e.g., a media access control address (MAC), a serial number, a name of the device, etc.) of the device communicating using the tested IP address. In the illustrated example, the lookup is performed using an Address Resolution Protocol (ARP) table.

Upon the local network device identifier 170 detecting a hardware address of a device on the network 118, the example schedule processor 165 determines whether the device is identified in the whitelist. (Block 715). If the device is not in the whitelist (Block 715 returns a result of NO), no updates will be received for the device. The example local network device identifier 170 stores a record of the identified device in the local device ID data store 175. (Block 720). The local network device identifier 170 transmits records of devices identified on the network to the local device information receiver 150 of the update distributor 105 (Block 722). Identifying, to the update distributor 105, devices on the network 118 is advantageous because it facilitates better scheduling of update broadcasts (e.g., updates may be more frequently broadcast to devices that appear more frequently).

If the device is in the whitelist (Block 715 returns a result of YES), the example schedule processor contacts the system version identifier 240 of the update client 121 corresponding to the detected device 120 to determine a current system version. (Block 725). In examples disclosed herein, the example system version identifier 240 detects the current system software version, however, any other version may be identified such as, for example, a hardware version, a version of a particular application executed by the device, a firmware version, etc.

The schedule processor 165 identifies an upcoming broadcast of an update for the device using the update schedule. (Block 730). The schedule processor determines whether the upcoming broadcast identifies a system version that is greater than the current system version reported by the system version identifier 240 (Block 735). Ensuring that updates to versions that are greater than the current version are applied ensures that an old update (i.e., an update that would, in fact, be a downgrade) is not applied. As noted above, in the illustrated example of FIG. 7, a system version is used to determine whether to store an update. However, any other version identifier may additionally or alternatively be used.

If the identified broadcast does not identify a system version greater than the current system version of the device identified on the network 118 (Block 735 returns a result of NO), the example local network device identifier 170 stores a record of the identified device in the local device ID data store 175 (Block 720). The local network device identifier 170 transmits records of devices identified on the network to the local device information receiver 150 of the update distributor 105 (Block 722).

If the identified broadcast identifies a system version greater than the current system version (Block 735 returns a result of YES), the example satellite receiver 160 records the broadcast update (Block 740). In the illustrated example of FIG. 7, the recorded update is stored in the example local update data store 180. The update communicator 185 then transmits a notification that an update is available to the applicable device 120 (and/or the update client 121 thereof) (Block 745), such that the update can be retrieved and/or otherwise applied to the device 120 (Block 750). An example approach to applying an update is disclosed below in connection with FIG. 8. In the illustrated example of FIG. 7, the example local network device identifier 170 informs the local device information receiver 150 of the application of the update (Block 755). Informing the local device information receiver 150 of the application of the update enables the broadcaster 145 to adapt future update schedules to account for updates that have already been applied.

In the illustrated example of FIG. 7, the example local network device identifier 170 stores a record of the identified device in the local device ID data store 175 (Block 720), and the local network device identifier 170 transmits records of devices identified on the network to the local device information receiver 150 of the update distributor 105 (Block 722). The example process of FIG. 7 then repeats to apply subsequently broadcasted updates to devices on the network 118.

FIG. 8 is a flowchart representative of example machine-readable instructions 750 which, when executed, cause the example update client 121 of FIG. 1 to apply an update. The example process 750 of FIG. 8 begins when the device 120 is in normal operation (Block 810). In normal operation, the example device 120 performs any function for which the device 120 was designed. For example, if the device 120 were a thermostat, the device 120 may perform a temperature control function; if the device 120 were a home automation system, the device 120 may perform a home automation function (e.g., controlling lighting, locking doors, controlling an architectural opening covering, etc.). The example update processor 230 of the example update client 121 monitors for an indication of availability of an update from the update hub 115. (Block 820). In examples disclosed herein, the example update processor 230 identifies the indication of update availability by monitoring communications on the network 118 for a broadcast message from the update communicator 185 indicating that an update is available. In some examples, the update processor 230 may transmit a request to confirm the availability and/or applicability of the update from the update hub 115. If no update is available (Block 820 returns a result of NO), control proceeds to block 810, where normal operation is continued.

If the update processor 230 identifies that an update is available (Block 820 returns a result of YES), the example update processor 230 clears the memory 210 to ensure that space is available for the update (Block 830). In some examples, memory space is cleared by deleting a prior update package stored in the memory 210. However, any other approach to clearing memory may additionally or alternatively be used. The example update processor 230 retrieves the update package from the update communicator 185 (Block 840). In examples disclosed herein, the update package is downloaded to (e.g., stored in) the memory 210 via the network. However, any other approach to communicating the update from the update hub 115 to the update client 121 and/or, more generally, the device 120, may additionally or alternatively be used. Upon completion of the download, the update processor 230 applies the update package (Block 850). In some examples, application of the update package may require a reboot of the device 120. In some examples, the update and/or the reboot may be postponed until a time when a user is not expected to be interrupted by application of the update. For example, if the device were a smart television, the update processor 230 might wait until a time period when the smart television is not typically used (e.g., 4 AM). However, any other approach to applying the update package may additionally or alternatively be used. Upon completion of the update (and/or the restart), the update processor 230 informs the update hub 115 of the application of the update (Block 860). Informing the update hub 115 of the update application enables the update hub to report the application of the update to the local device information receiver 150. Moreover, informing the update hub 115 of the application of the update may cause the update hub 115 to not apply further updates unless the update is greater than the newly updated system version number. In some examples, in lieu of reporting the application of the update via the update hub 115, the update processor 230 may report the application of the update directly to the local device information receiver 150 of the update distributor 105. In the illustrated example of FIG. 8, the example device 120 resumes normal operation (Block 810). The example process 800 of FIG. 8 continues to apply additional updates as they are made available by the update hub 115.

Figure 9:
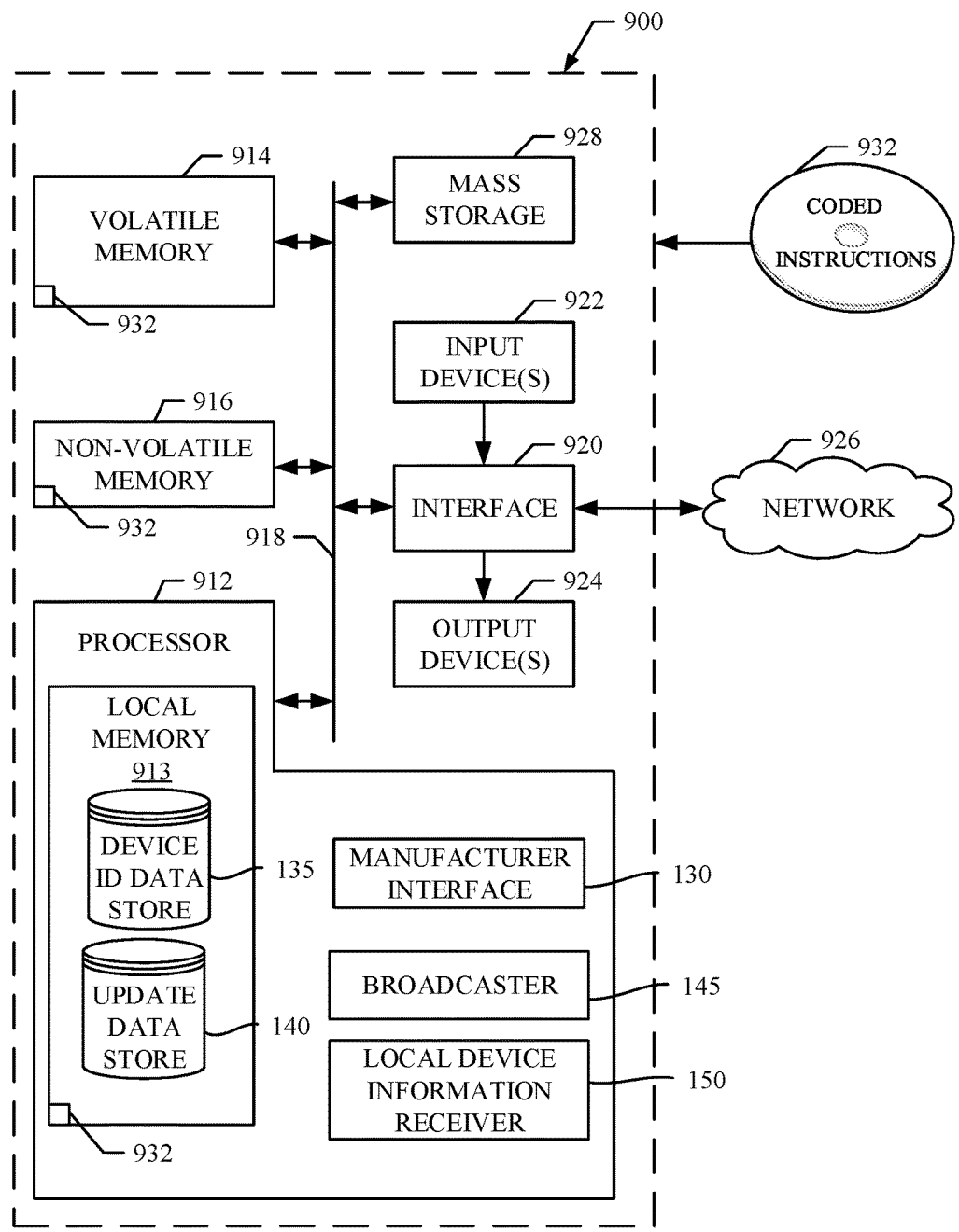
FIG. 9 is a block diagram of an example processor platform 900 capable of executing the instructions of FIG. 4 to implement the example update distributor of FIG. 1.

FIG. 9 is a block diagram of an example processor platform 900 capable of executing the instructions of FIG. 4 to implement the example update distributor 105 of FIG. 1. The processor platform 900 can be, for example, a server, a personal computer, an Internet appliance, or any other type of computing device.

The processor platform 900 of the illustrated example includes a processor 912. The processor 912 of the illustrated example is hardware. For example, the processor 912 can be implemented by one or more integrated circuits, logic circuits, microprocessors or controllers from any desired family or manufacturer.

The processor 912 of the illustrated example includes a local memory 913 (e.g., a cache). The example processor 912 executes instructions stored in the local memory 913 to implement the example manufacturer interface 130, the example broadcaster 145, and/or the example local device information receiver 150. The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller. In the illustrated example of FIG. 9, the local memory 913 implements the example device ID data store 135 and the example update data store 140. However, the example device ID data store 135 and/or the example update data store 140 may be implemented by any other memory such as, for example, the volatile memory 914, the non-volatile memory 916, the mass storage 928, the coded instructions 932, etc.

The processor platform 900 of the illustrated example also includes an interface circuit 920. The interface circuit 920 may be implemented by any type of interface standard, such as an Ethernet interface, a universal serial bus (USB), and/or a PCI express interface.

In the illustrated example, one or more input devices 922 are connected to the interface circuit 920. The input device(s) 922 permit(s) a user to enter data and commands into the processor 912. The input device(s) can be implemented by, for example, a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 920 of the illustrated example, thus, typically includes a graphics driver card, a graphics driver chip or a graphics driver processor.

The interface circuit 920 of the illustrated example also includes a communication device such as a transmitter, a receiver, a transceiver, a modem and/or network interface card to facilitate exchange of data with external machines (e.g., computing devices of any kind) via a network 926

(e.g., an Ethernet connection, a digital subscriber line (DSL), a telephone line, coaxial cable, a cellular telephone system, etc.). In examples disclosed herein, the interface circuit 920 facilitates communication via the satellite 108.

The processor platform 900 of the illustrated example also includes one or more mass storage devices 928 for storing software and/or data. Examples of such mass storage devices 928 include floppy disk drives, hard drive disks, compact disk drives, Blu-ray disk drives, RAID systems, and digital versatile disk (DVD) drives.

The coded instructions 932 of FIG. 4 may be stored in the mass storage device 928, in the volatile memory 914, in the non-volatile memory 916, and/or on a removable tangible computer readable storage medium such as a CD or DVD.

Figure 10:
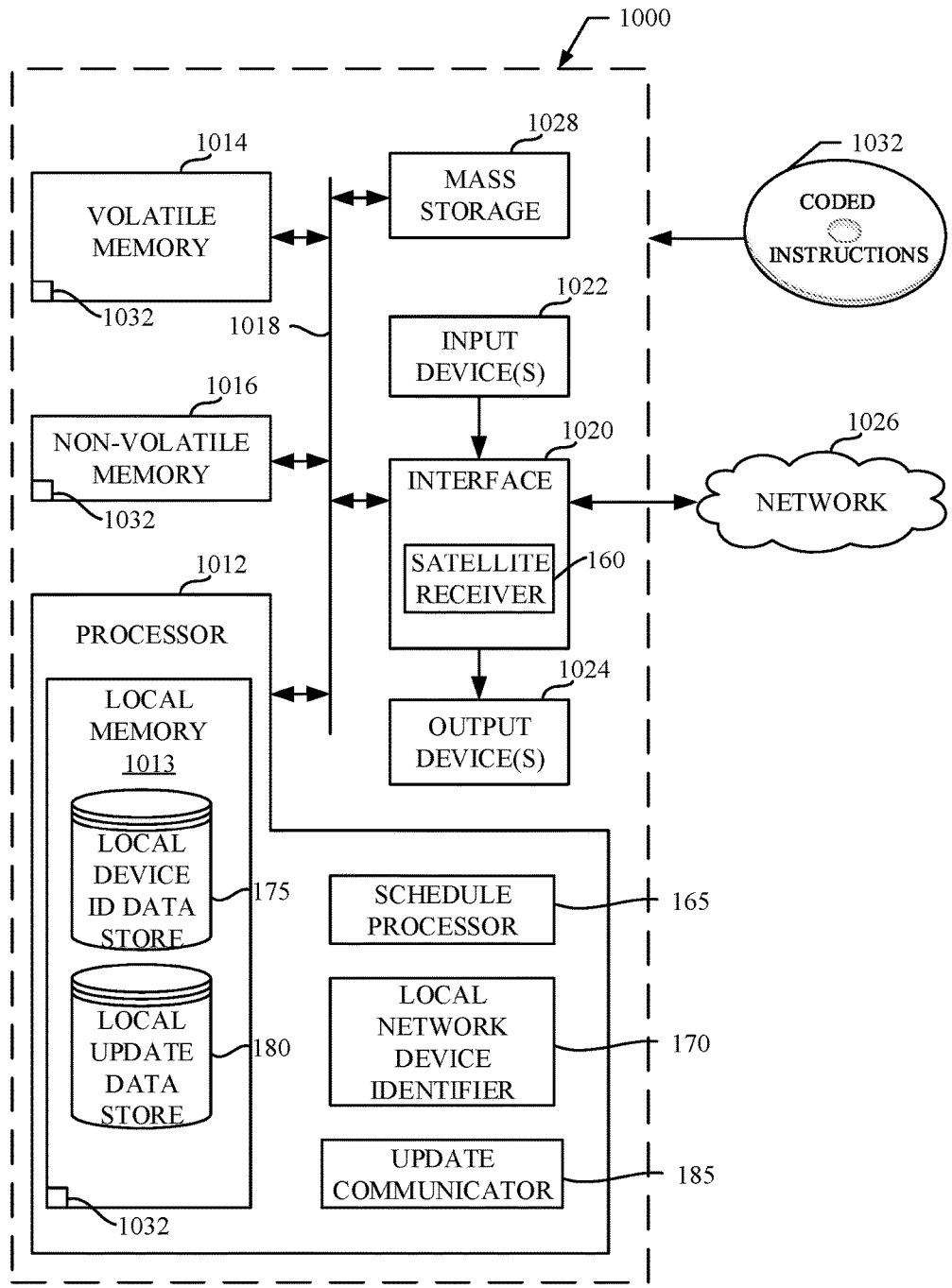
FIG. 10 is a block diagram of an example processor platform 1000 capable of executing the instructions of FIGS. 6 and/or 7 to implement the example update hub of FIG. 1.

FIG. 10 is a block diagram of an example processor platform 1000 capable of executing the instructions of FIGS. 6 and/or 7 to implement the example update hub 115 of FIG. 1. The processor platform 1000 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors or controllers from any desired family or manufacturer.

The processor 1012 of the illustrated example includes a local memory 1013 (e.g., a cache). The example processor 1012 executes instructions stored in the local memory 1013 to implement the example schedule processor 165, the example local network device identifier 170, and/or the example update communicator 185. The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1014, 1016 is controlled by a memory controller. In the illustrated example of FIG. 10, the local memory 1013 implements the example local device ID data store 175 and the example local update data store 180. However, the example local device ID data store 175 and/or the example local update data store 180 may be implemented by any other memory such as, for example, the volatile memory 1014, the non-volatile memory 1016, the mass storage 1028, the coded instructions 1032, etc.

The processor platform 1000 of the illustrated example also includes an interface circuit 1020. The interface circuit 1020 may be implemented by any type of interface standard, such as an Ethernet interface, a universal serial bus (USB), and/or a PCI express interface.

In the illustrated example, one or more input devices 1022 are connected to the interface circuit 1020. The input device(s) 1022 permit(s) a user to enter data and commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1020 of the illustrated example, thus, typically includes a graphics driver card, a graphics driver chip or a graphics driver processor.

The interface circuit 1020 of the illustrated example also includes a communication device such as a transmitter, a receiver, a transceiver, a modem and/or network interface card to facilitate exchange of data with external machines (e.g., computing devices of any kind) via a network 1026 (e.g., an Ethernet connection, a digital subscriber line (DSL), a telephone line, coaxial cable, a cellular telephone system, etc.). In the illustrated example of FIG. 10, the example interface 1020 implements the example satellite receiver 160.

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, RAID systems, and digital versatile disk (DVD) drives.

The coded instructions 1032 of FIGS. 6 and/or 7 may be stored in the mass storage device 1028, in the volatile memory 1014, in the non-volatile memory 1016, and/or on a removable tangible computer readable storage medium such as a CD or DVD.

Figure 11:
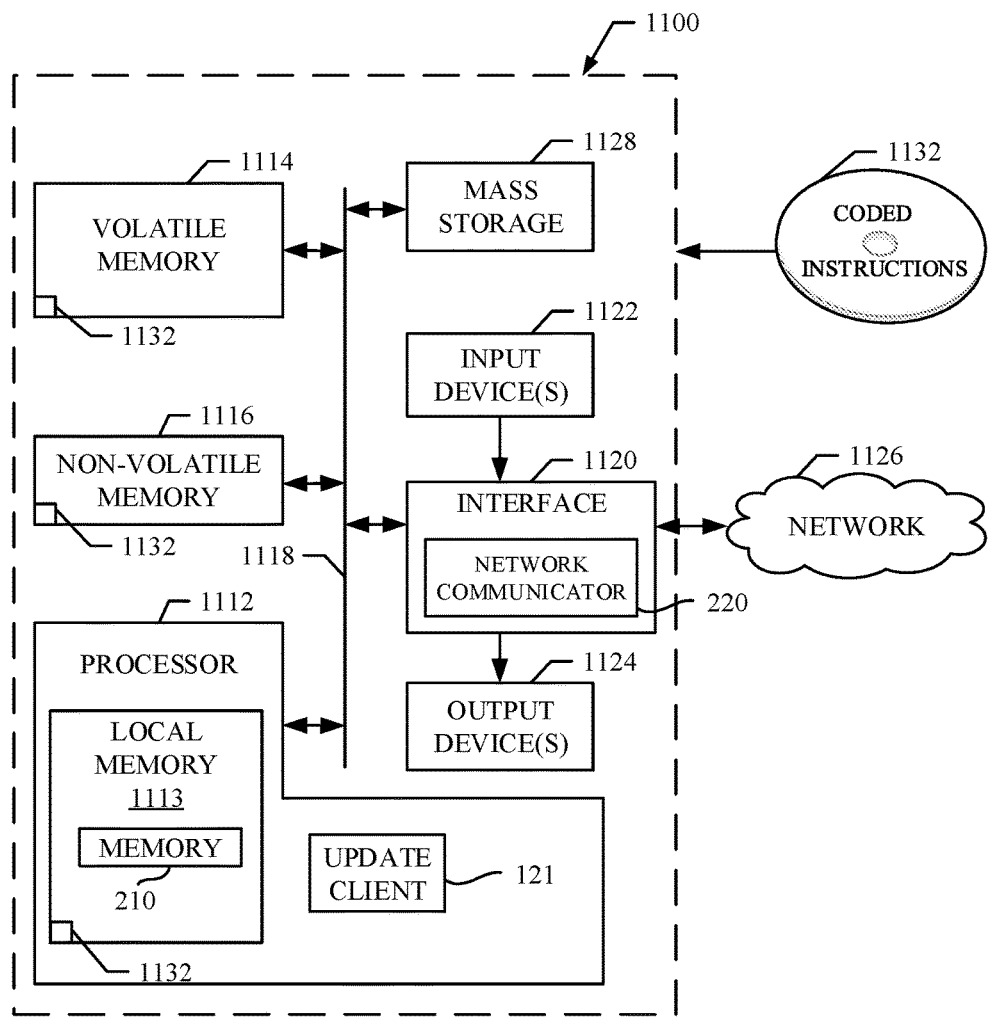
FIG. 11 is a block diagram of an example processor platform 1100 capable of executing the instructions of FIG. 8 to implement the example update client of FIG. 1.

FIG. 11 is a block diagram of an example processor platform 1100 capable of executing the instructions of FIG. 8 to implement the example device 120 of FIGS. 1 and/or 2. The processor platform 1100 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors or controllers from any desired family or manufacturer.

The processor 1112 of the illustrated example includes a local memory 1113 (e.g., a cache). The example processor 1112 executes instructions stored in the local memory 1113 to implement the example update client 121. The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1116 may be implemented by flash memory and/or any other desired type of memory device. Access to the main memory 1114, 1116 is controlled by a memory controller. In the illustrated example of FIG. 11, the local memory 1113 implements the example memory 210 of FIG. 2. However, the example memory 210 of FIG. 2 may be implemented by any other memory such as, for example, the volatile memory 1114, the non-volatile memory 1116, the mass storage 1128, the coded instructions 1132, etc.

The processor platform 1100 of the illustrated example also includes an interface circuit 1120. The interface circuit 1120 may be implemented by any type of interface standard, such as an Ethernet interface, a universal serial bus (USB), and/or a PCI express interface.

In the illustrated example, one or more input devices 1122 are connected to the interface circuit 1120. The input device(s) 1122 permit(s) a user to enter data and commands into the processor 1112. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1124 are also connected to the interface circuit 1120 of the illustrated example. The output devices 1124 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1120 of the illustrated example, thus, typically includes a graphics driver card, a graphics driver chip or a graphics driver processor.

The interface circuit 1120 of the illustrated example also includes a communication device such as a transmitter, a receiver, a transceiver, a modem and/or network interface card to facilitate exchange of data with external machines (e.g., computing devices of any kind) via a network 1126 (e.g., an Ethernet connection, a digital subscriber line (DSL), a telephone line, coaxial cable, a cellular telephone system, etc.).

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, RAID systems, and digital versatile disk (DVD) drives.

The coded instructions 1132 of FIG. 8 may be stored in the mass storage device 1128, in the volatile memory 1114, in the non-volatile memory 1116, and/or on a removable tangible computer readable storage medium such as a CD or DVD.

From the foregoing, it will be appreciated that the above disclosed methods, apparatus and articles of manufacture enable updates to be applied to device. In examples disclosed herein, an update(s) is provided to an update distributor which distributes the update(s) via satellite broadcast. That is, the update is transmitted once to many receiving locations (e.g., update hubs). In contrast, prior techniques utilized unicast transmissions to each of the devices receiving the update. As such, an update having a size of two gigabytes being transmitted to one hundred thousand smartphones results in two hundred terabytes of data to be transmitted (e.g., via an Internet Service Provider, via a cellular network). Using techniques disclosed herein, the update can be broadcast once, and be delivered to those devices. As a result, transmission loads associated with providing updates via traditional update delivery mechanisms are avoided and/or reduced.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method to provide an update, the method comprising:
    scanning, by executing an instruction with a processor, a local area network to identify a device in communication with the local area network;
    comparing, by executing an instruction with the processor, a hardware address of the device against a whitelist of hardware addresses included in an update schedule; and
    in response to (a) detecting that the hardware address of the device is included in the whitelist of hardware addresses, (b) identifying a first time indicative of a scheduled broadcast time for the update, and (c) identifying a first broadcast channel associated with the first time:
        recording, by executing an instruction with the processor, the update identified in the update schedule during the first time, the update received via a broadcast transmission over the first broadcast channel; and
        transmitting, by executing an instruction with the processor, the update to the device at a second time after the first time.

2. The method of claim 1, wherein the local area network is a wireless local area network.

3. The method of claim 1, wherein the transmitting of the update further includes providing an instruction to the device to cause the device to retrieve the update from the processor.

4. The method of claim 1, further including comparing a current version of software operated by the device to a version identified in the update schedule, and wherein the recording of the update and the transmitting of the update are further performed in response to detecting that the version identified in the update schedule is greater than the current version of software operated by the device.

5. The method of claim 1, further including reporting the hardware address of the device in communication with the local area network to an update distributor.

6. The method of claim 5, wherein the hardware address is a media access control address.

7. The method of claim 1, wherein the transmitting of the update includes sending the update via a unicast transmission.

8. The method of claim 1, wherein the device is not used to present media received via a satellite broadcast.

9. The method of claim 1, wherein the update is at least one of a software application update, a firmware update, configuration data, an operating system update, or a driver update.

10. An apparatus comprising:
    a processor; and
    a memory to store machine readable instructions that, when executed by the processor, cause the processor to perform operations including:
        scanning a local area network to identify a device in communication with the local area network;
        comparing a hardware address of the device against a whitelist of hardware addresses included in an update schedule; and
        in response to (a) detecting that the hardware address of the device is included in the whitelist of hardware addresses, (b) identifying a first time indicative of a scheduled broadcast time for an update, and (c) identifying a first broadcast channel associated with the first time:

recording the update identified in the update schedule during the first time, the update received via a broadcast transmission over the first broadcast channel; and transmitting the update to the device at a second time after the first time.

11. The apparatus of claim 10, wherein the local area network is a wireless local area network.

12. The apparatus of claim 10, wherein the transmitting of the update further includes providing an instruction to the device to cause the device to retrieve the update from the apparatus.

13. The apparatus of claim 10, further including comparing a current version of software operated by the device to a version identified in the update schedule, and wherein the recording of the update and the transmitting of the update are further performed in response to detecting that the version identified in the update schedule is greater than the current version of software operated by the device.

14. The apparatus of claim 10, further including reporting the hardware address of the device in communication with the local area network to an update distributor.

15. The apparatus of claim 10, wherein the transmitting of the update includes sending the update via a unicast transmission.

16. The apparatus of claim 10, wherein the device is not used to present media received via a satellite broadcast.

17. The apparatus of claim 10, wherein the update is at least one of a software application update, a firmware update, configuration data, an operating system update, or a driver update.

18. A tangible machine readable storage disk or storage device comprising instructions which, when executed, cause a machine to perform operations comprising:

scanning a local area network to identify a device in communication with the local area network;

comparing a hardware address of the device against a whitelist of hardware addresses included in an update schedule; and in response to (a) detecting that the hardware address of the device is included in the whitelist of hardware addresses, (b) identifying a first time indicative of a scheduled broadcast time for an update, and (c) identifying a first broadcast channel associated with the first time:

recording an update identified in the update schedule during the first time, the update received via a broadcast transmission over the first broadcast channel; and transmitting the update to the device at a second time after the first time.

19. The tangible machine readable storage disk or storage device of claim 18, wherein the local area network is a wireless local area network.

20. The tangible machine readable storage disk or storage device of claim 18, wherein the transmitting of the recorded update further includes providing an instruction to the device to cause the device to retrieve the update.

21. The tangible machine readable storage disk or storage device of claim 18, further including comparing a current version of software operated by the device to a version identified in the update schedule, and wherein the recording of the update and the transmitting of the update are further performed in response to detecting that the version identified in the update schedule is greater than the current version of software operated by the device.

22. The tangible machine readable storage disk or storage device of claim 18, further including reporting the hardware address of the device in communication with the local area network to an update distributor.

23. The tangible machine readable storage disk or storage device of claim 18, wherein the transmitting of the update includes sending the update via a unicast transmission.

24. The tangible machine readable storage disk or storage device of claim 18, wherein the device is not used to present media received via a satellite broadcast.

25. The tangible machine readable storage disk or storage device of claim 18, wherein the update is at least one of a software application update, a firmware update, configuration data, an operating system update, or a driver update.

* * * * *